O. DEBOLD.
VENTILATOR.
APPLICATION FILED FEB. 28, 1919.
1,306,253.
Patented June 10, 1919.
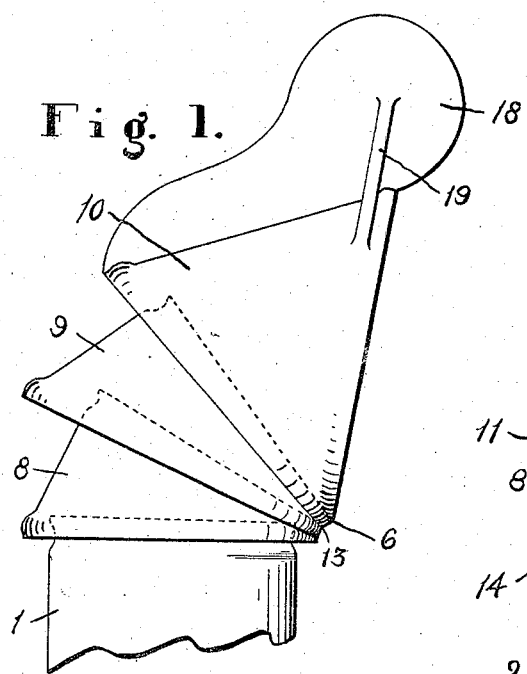
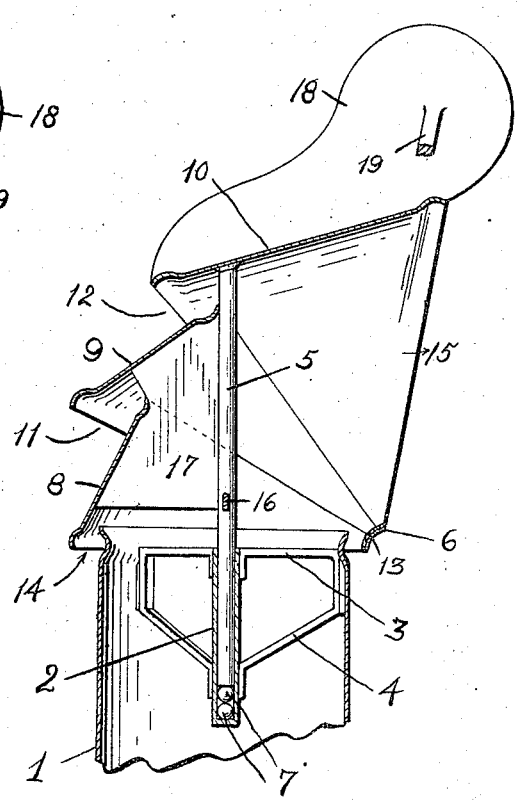
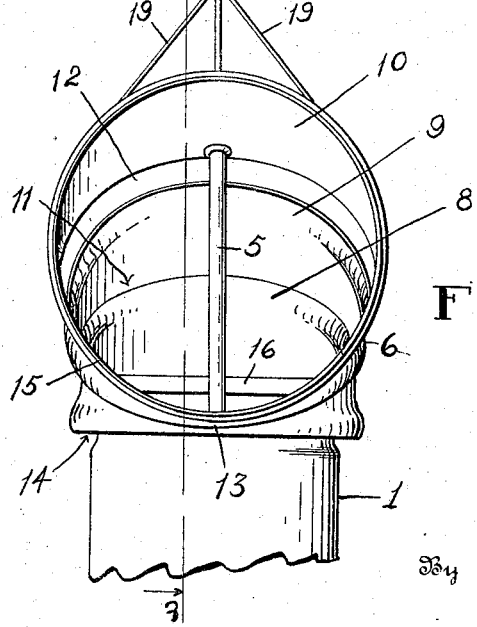
Fig. 1.
Fig. 3.
Fig. 2.
Inventor:
Otto Debold,
By Russell M. Everett,
Attorney.

UNITED STATES PATENT OFFICE.

OTTO DEBOLD, OF NEWARK, NEW JERSEY.

VENTILATOR.

1,306,253.

Specification of Letters Patent.  Patented June 10, 1919.

Application filed February 28, 1919. Serial No. 279,734.

*To all whom it may concern:*

Be it known that I, OTTO DEBOLD, a citizen of Germany, and a resident of Newark, in the county of Essex and State of New Jersey, have invented new and useful Improvements in Ventilators, of which the following is a specification.

This invention relates more especially to devices for the tops of ventilating pipes, chimneys and the like which extend above the roofs of buildings, and the objects of the invention are to obstruct the passage of air from said pipes, chimneys and the like as little as possible, and at the same time afford the completest possible protection against the entry of rain, snow, dust, dirt and so forth; to secure a simple construction which shall be durable and not likely to get out of order; to enable the opening of the ventilator to always face away from the wind and yet obtain the fullest advantage of said wind in producing a draft through the ventilator; to prevent such draft from carrying rain or the like down the ventilator pipe, and to obtain other advantages and results as may be brought out in the following description.

Referring to the accompanying drawings, in which like numerals of reference indicate the same parts throughout the several views, Figure 1 is a side elevation of my invention;

Fig. 2 is an elevation looking to the windward, and

Fig. 3 is a vertical central section on line 3—3, Fig. 2.

In the specific embodiment of the invention shown in said drawings, 1 indicates a pipe or tubular section adapted to be connected in any ordinary and well-known manner to the top of a chimney, ventilator pipe or the like, and carry my improved device. For this purpose said base section 1 is provided with a central socket 2 which is fixedly supported in any suitable manner, as by arms 3, 4 from the sides of the tubular section 1. This socket is open at its top to receive the stem 5 of the revolving cowl 6, and preferably balls 7 are placed in the socket 2 beneath said stem 5 to make it turn easier.

The said cowl 6 is in general elbow-shaped and composed of annular sections 8, 9 and 10 assembled in a louver-like construction so as to provide transverse crescent-shaped openings 11, 12 at the outer bend of said elbow. The annular sections 8, 9 and 10 are each very narrow at the portion opposite the widest portion of said openings 11, 12 and are firmly soldered or otherwise securely secured thereat in overlapping relation, as shown at 13, while at their diametrically opposite points said sections are wide and overlapping, so as to bring the plane of the lower end 14 of the cowl and of its upper end 90° or more apart. Said lower end fits over the top of the base section 1, preferably loosely enough to permit the passage of air, and the other end is of course directed laterally to form an outlet 15. The sections are rigidly connected to the stem 5 in any suitable manner, the means shown comprising a cross bar 16 extending diametrically of the lower section 8 through the stem, a wing 17 on the stem opposite the opening 15 of the cowl and secured at its edges to the two lower sections 8 and 9, and the upper section 10 resting upon the top of the stem 5 and secured thereto as by soldering. Preferably the upper edge of the middle section 9 abuts laterally against the stem as shown. The wing 17, extending into the elbow of the cowl opposite its outlet 15, aids in preventing any cross drafts through the louver openings and directs them all out through the outlet 15 of the cowl. This strengthens the draft up through the base section 1 and lessens any tendency toward down draft, so that the ventilator operates more effectively and is not so subject to unfavorable conditions.

The upper section 10 is provided at its top with a vane 18, having braces 19, by which I insure that the cowl shall always turn with the wind so as to face away from it. In this position, the wind passes through the louver openings 11, 12 toward the lateral opening 15 of the cowl, and since the sections 8, 9 and 10 are annular, the draft must pass across the top of the base piece 1 and out through the opening 15. Furthermore, the annular construction of the sections is much stronger, and enables the cowl to be assembled so as to be more durable and less likely to get out of order.

Obviously various modifications and changes may be made in manufacturing my improved ventilator without departing from the spirit and scope of the invention, and I do not wish to be understood as limiting myself except as required by the following claims when construed in the light of the prior art.

Having thus described the invention, what I claim is:

1. In a ventilator having a rotary elbow shaped cowl, a longitudinally disposed wing arranged within the elbow portion thereof, said wing extending in a direction away from the discharge opening of the cowl toward the back thereof.

2. In a ventilator having a rotary elbow shaped cowl formed in sections with louver openings between the same, a longitudinally disposed wing arranged within the elbow and extending in a direction away from the discharge opening of the cowl toward the back thereof, the edge of the wing extending across one of the louver openings and being secured to the cowl sections.

3. In a ventilator having a rotary elbow shaped cowl formed in sections with louver openings between the same and a stem extending from the top of the cowl through the lower end thereof, a longitudinally disposed wing arranged within the elbow and extending rearwardly from the stem away from the discharge opening of the cowl, the forward edge of the wing being secured to the stem while the rear edge thereof spans one of the louver openings and is secured to the cowl sections.

OTTO DEBOLD.

Copies of this patent may be obtained for five cents each, by addressing the "Commissioner of Patents, Washington, D. C."